US012580196B2

(12) United States Patent
Rhee et al.

(10) Patent No.: US 12,580,196 B2
(45) Date of Patent: Mar. 17, 2026

(54) POSITIVE ELECTRODE SLURRY FOR LITHIUM SECONDARY BATTERY, PREPARATION METHOD FOR SAME, POSITIVE ELECTRODE FOR LITHIUM SECONDARY BATTERY, AND LITHIUM SECONDARY BATTERY

(71) Applicants: Hyundai Motor Company, Seoul (KR); Kia Corporation, Seoul (KR); Daegu Gyeongbuk Institute of Science and Technology, Daegu (KR)

(72) Inventors: Jun Ki Rhee, Suwon (KR); Sung Ho Ban, Hwaseong (KR); Yoon Sung Lee, Suwon (KR); Ko Eun Kim, Cheongju (KR); Hyun Tae Lee, Daegu (KR); Hong Kyung Lee, Daegu (KR)

(73) Assignees: Hyundai Motor Company, Seoul (KR); Kia Corporation, Seoul (KR); Daegu Gyeongbuk Institute of Science and Technology, Daegu (KR)

( * ) Notice: Subject to any disclaimer, the term of this patent is extended or adjusted under 35 U.S.C. 154(b) by 795 days.

(21) Appl. No.: 17/893,826

(22) Filed: Aug. 23, 2022

(65) Prior Publication Data

US 2023/0130827 A1     Apr. 27, 2023

(30) Foreign Application Priority Data

Oct. 27, 2021     (KR) ........................ 10-2021-0144454

(51) Int. Cl.
*H01M 4/62* (2006.01)
*H01M 4/505* (2010.01)
*H01M 4/525* (2010.01)
*H01M 10/052* (2010.01)
*H01M 4/02* (2006.01)

(52) U.S. Cl.
CPC ............. *H01M 4/62* (2013.01); *H01M 4/505* (2013.01); *H01M 4/525* (2013.01); *H01M 10/052* (2013.01); *H01M 2004/021* (2013.01); *H01M 2004/028* (2013.01)

(58) Field of Classification Search
CPC ........ H01M 4/62; H01M 4/505; H01M 4/525; H01M 2004/028
See application file for complete search history.

(56) References Cited

U.S. PATENT DOCUMENTS

| | | | |
|---|---|---|---|
| 6,664,006 B1 | 12/2003 | Munshi | |
| 2003/0113625 A1* | 6/2003 | Kim ..................... | H01M 4/623 429/231.1 |
| 2004/0151985 A1 | 8/2004 | Munshi | |
| 2008/0118836 A1 | 5/2008 | Hwang et al. | |

(Continued)

FOREIGN PATENT DOCUMENTS

| | | |
|---|---|---|
| CN | 107195915 B | 11/2019 |
| KR | 10-2004-0015999 A | 2/2004 |

(Continued)

*Primary Examiner* — Nicholas A Smith
*Assistant Examiner* — Ziheng Lu
(74) *Attorney, Agent, or Firm* — Fox Rothschild LLP

(57) ABSTRACT

Disclosed are, inter alia, a positive electrode slurry containing reduced content of a binder, a method of preparing the positive electrode slurry, a positive electrode made from the slurry and a lithium secondary battery including the positive electrode.

9 Claims, 3 Drawing Sheets

(56) References Cited

U.S. PATENT DOCUMENTS

2017/0324096 A1* 11/2017 Korchev ................... C09C 1/56
2021/0399276 A1* 12/2021 Uhm ................ H01M 10/0565

FOREIGN PATENT DOCUMENTS

| KR | 10-2007-0045087 A | 5/2007 |
| KR | 10-2013-0127859 A | 11/2013 |
| KR | 10-2014-0070259 A | 6/2014 |
| KR | 10-2017112 B1 | 9/2019 |

* cited by examiner

Capacity Retention(%)

Cycle number

POSITIVE ELECTRODE SLURRY FOR LITHIUM SECONDARY BATTERY, PREPARATION METHOD FOR SAME, POSITIVE ELECTRODE FOR LITHIUM SECONDARY BATTERY, AND LITHIUM SECONDARY BATTERY

CROSS REFERENCE TO RELATED APPLICATION

The present application claims priority to Korean Patent Application No. 10-2021-0144454, filed Oct. 27, 2021, the entire contents of which is incorporated herein for all purposes by this reference.

TECHNICAL FIELD

The present invention relates to a slurry composition for a positive electrode slurry for a lithium secondary battery, a method for preparing the slurry composition, a positive electrode prepared by the method, a positive electrode of a lithium secondary battery made from the slurry composition, and a lithium secondary battery including the positive electrode.

BACKGROUND

Lithium secondary batteries are eco-friendly because they generate less waste and can be charged and discharged more than 500 times, making them suitable for use as energy sources for electronic devices such as laptops and smartphones. In particular, lithium secondary batteries have been used as an energy source for hybrid electric vehicles (HEVs) and electric vehicles (EVs) that require high output and require a lot of energy for driving.

A lithium secondary battery has a structure in which a lithium electrolyte is incorporated in an electrode assembly composed of a positive electrode, a negative electrode, and a separator. Since the lithium secondary battery provides a voltage of 3.4 V or greater, a non-aqueous organic solvent that does not decompose even at a high voltage is mainly used for the lithium secondary battery.

The positive and negative electrodes of a lithium secondary battery have been manufactured by applying positive and negative electrodes slurries on aluminum foil (current collector). For example, a slurry may be prepared by mixing an active material for storing energy, a conductive material for imparting electric conductivity, and a binder for attaching the materials to aluminum foil with an organic solvent.

As the positive electrode active material, lithium cobalt oxide, lithium manganese oxide, lithium nickel oxide, nickel-cobalt-manganese-composite lithium oxide, etc. have been used, and as the negative electrode active material, carbon-based material, silicon, etc. have been used mainly used.

In the related art, it has been reported that aluminum oxide ($Al_2O_3$ called alumina) may be added to a negative electrode slurry, which may improve the life and cycle characteristics of the battery by increasing the adhesive strength between the negative active material and the conductive material and the adhesive strength between the negative active material and the current collector. It has been also reported that a binder containing a small amount of alumina having a nano-size may be added.

The foregoing is intended merely to aid in the understanding of the background of the present invention, and is not intended to mean that the present invention falls within the purview of the related art that is already known to those skilled in the art.

SUMMARY OF THE INVENTION

In one preferred aspect, provided is a composition for a positive electrode of a lithium secondary battery. The composition may include increased amounts of a positive electrode material and a conductive material, and a decreased amount of a binder compared to conventional lithium secondary battery positive electrode slurries, such that the slurry may improve the electrochemical properties of a lithium secondary battery and having an improved or equal binding degree. In further preferred aspect, provided are a positive electrode of a lithium secondary battery manufactured from the slurry composition and a lithium secondary battery including the same.

In an aspect, provided is a composition for a positive electrode of a lithium secondary battery. The composition may include a positive electrode active material, a conductive material, a binder, and silica. Particularly, a weight ratio between the positive electrode active material, the conductive material, the binder, and the silica may range from about 93:4:2.7:0.3 to about 93:4:2:1. In certain aspects, the composition may be considered or referred to as a slurry composition.

The silica may suitably include silica fume.

The silica may suitably have a particle diameter of about 1 to 7 nm.

A term "diameter" as used herein refers to a size of the particle, which is measured by maximum distance of two points on the particle.

The positive electrode active material may include one or more selected from nickel, cobalt, and manganese. The positive electrode active material may include nickel, cobalt, and manganese.

The composition may further include a solvent component.

In another aspect, provided is a method of preparing a slurry for a positive electrode of a lithium secondary battery. The method includes: preparing a binder solution including a binder and silica in a solvent; and adding a positive electrode active material and a conductive material in the binder solution. In particular, a weight ratio between the positive electrode active material, the conductive material, the binder, and the silica may be from about 93:4:2.7:0.3 to about 93:4:2.4:0.6.

Also provided is a positive electrode of a lithium secondary battery. The positive electrode may be prepared from the composition as described herein. The positive electrode may have a loading density of the positive electrode active material ranging from about 3.0 to about 19.0 mg/cm².

Further, in an aspect, provided is a lithium secondary battery including the positive electrode as described herein.

According to various exemplary embodiments of the present invention, adhesive strength of the slurry may be maintained or increased even with a reduced amount of binder. Further, deterioration of the secondary battery positive electrode may be prevented by suppressing HF generated under high temperature conditions from reacting with silica. According to various exemplary embodiments of the present invention, the lithium secondary battery may have improved lifespan characteristics even under high output (e.g., 4 C) conditions at a high electrode loading density.

In a further aspect, a vehicle is provided that include a electrode as disclosed herein. Also provided are vehicles that comprise a battery as disclosed herein.

Other aspects of the invention are disclosed infra.

BRIEF DESCRIPTION OF THE DRAWINGS

The above and other objects, features, and other advantages of the present invention will be more clearly understood from the following detailed description taken in conjunction with the accompanying drawings, in which.

DETAILED DESCRIPTION

Figure 1:
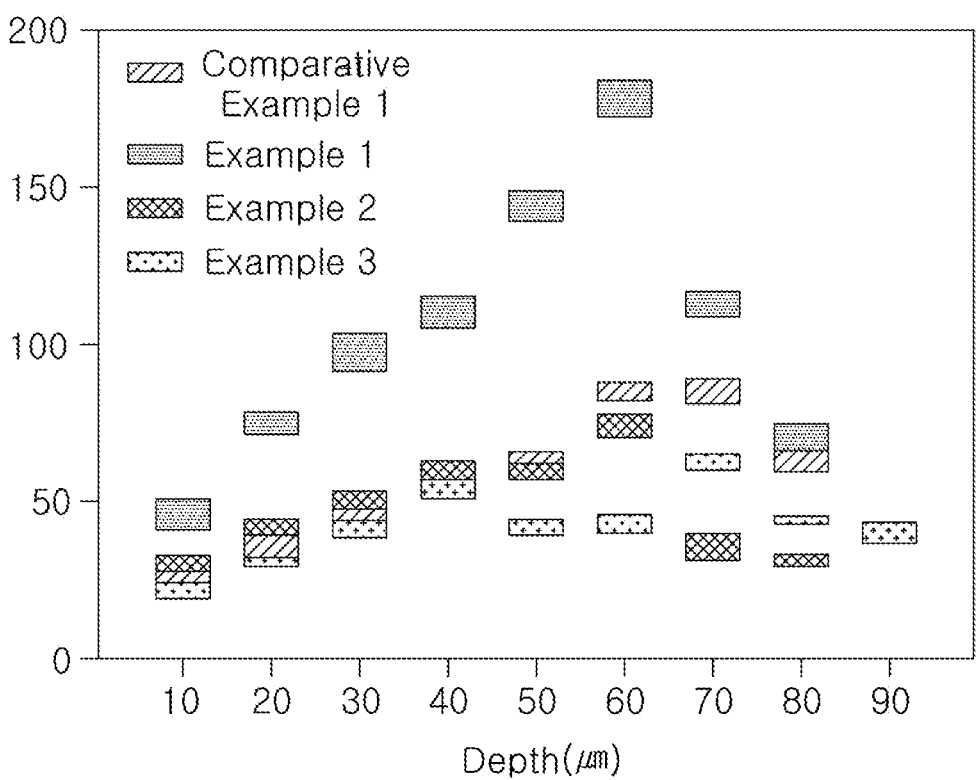
FIG. 1 shows a graph showing comparison in adhesive strength across a depth between Examples according to exemplary embodiments of the present invention and Comparative Examples.

Hereinafter, details of a technology for achieving the objectives and solving the problems described above will be described in detail with reference to the accompanying drawings. On the other hand, when the detailed description of a known technology in the same field is not helpful in understanding the key concept of the invention, the description will be omitted. The technical spirit of the invention is not limited to the description provided herein and may be implemented in various modified forms by those skilled in the art.

The above objects, other objects, features, and advantages of the present invention will be readily understood through the following preferred exemplary embodiments related to the accompanying drawings. However, the present invention is not limited to the exemplary embodiments described herein and can also be specified in other forms. Rather, the exemplary embodiments described herein are provided so that the disclosed contents can be thorough and complete and the spirit of the present invention can be sufficiently conveyed to those skilled in the art.

Similar reference numerals have been used for similar components while describing each drawing. In the accompanying drawings, the dimensions of the structures are shown larger than those of the real ones for the clarity of the present invention. The terms first, second, etc. can be used to describe various components, but the components should not be limited to the above terms. The terms are used only for the purpose of distinguishing one component from another. For example, a first component can be named as a second component without departing from the scope of the present invention, and similarly, the second component can also be named as the first component. The singular expression includes a plurality of expressions unless the context clearly mean otherwise.

In the present specification, it should be understood that the term "include" or "have" is intended to specify the presence of features, numbers, steps, operations, components, parts or combinations thereof described in the specification, and does not preclude the possibility of the presence or addition of one or more other features or numbers, steps, operations, components, parts or combinations thereof in advance. In addition, if an element such as a layer, a membrane, a region, a plate, etc. is said to be "on" another portion, this includes not only a case where it is "directly above" another portion, but also a case where it has other parts interposed therebetween. Conversely, if an element such as a layer, a membrane, a region, a plate, etc. is said to be "under" another portion, this includes not only a case where it is "directly under" another portion, but also a case where it has other portions interposed therebetween.

Unless otherwise specified, since all numbers, values, and/or expressions representing components, reaction conditions, polymer compositions, and an amount of mixtures used in the present specification are approximations reflecting various uncertainties of measurements that essentially occur in obtaining these values from the others, it should be understood that all cases are expressed by the term "about". Unless specifically stated or obvious from context, as used herein, the term "about" is understood as within a range of normal tolerance in the art, for example within 2 standard deviations of the mean. "About" can be understood as within 10%, 9%, 8%, 7%, 6%, 5%, 4%, 3%, 2%, 1%, 0.5%, 0.1%, 0.05%, or 0.01% of the stated value. Unless otherwise clear from the context, all numerical values provided herein are modified by the term "about."

In addition, if the numerical range is disclosed in the present invention, this range is continuous, and includes all values from the minimum value to the maximum value in this range unless indicated otherwise. Furthermore, if this range refers to an integer, all integers including the minimum value to the maximum value are included unless otherwise indicated. In the present specification, when a range is described for a variable, it will be understood that the variable includes all values including the end points described within the stated range. For example, the range of "5 to 10" will be understood to include any subranges, such as 6 to 10, 7 to 10, 6 to 9, 7 to 9, and the like, as well as individual values of 5, 6, 7, 8, 9 and 10, and will also be understood to include any value between valid integers within the stated range, such as 5.5, 6.5, 7.5, 5.5 to 8.5, 6.5 to 9, and the like. Also, for example, the range of "10% to 30%" will be understood to include subranges, such as 10% to 15%, 12% to 18%, 20% to 30%, etc., as well as all integers including values of 10%, 11%, 12%, 13% and the like up to 30%, and will also be understood to include any value between valid integers within the stated range, such as 10.5%, 15.5%, 25.5%, and the like.

Provided is a slurry composition for a positive electrode of a lithium secondary battery, which includes a positive electrode active material, and the positive active material includes a conductive material, a binder, and silica ($SiO_2$). In particular, a weight ratio between the positive electrode active material, the conductive material, the binder, and the silica may range from about 93:4:2.7:0.3 to about 93:4:2:1.

The slurry composition may further include a solvent component.

Preferably, the slurry composition may be prepared by the method described below.

A binder solution may be prepared by mixing a binder and silica in a solvent component. The term "solution" as used herein includes a wide range of fluid admixtures including true solutions as well as dispersions and other fluid admixtures that may not be considered true solutions.

The solvent component may include one or more selected from the group consisting of N-methyl pyrrolidone (NMP), a carbonate-based solvent, an ester-based solvent, an ether-based solvent, and a ketone-based solvent.

The carbonate-based solvent may suitably include dimethyl carbonate (DMC), diethyl carbonate (DEC), dipropyl carbonate (DPC), methylpropyl carbonate (MPC), ethylpropyl carbonate (EPC), ethylmethyl carbonate (EMC), ethylene carbonate (EC), propylene carbonate (PC), butylene carbonate (BC), fluoroethylene carbonate (FEC), vinylene carbonate (VC), and the like As the ester solvent, γ-butyrolactone (GBL), n-methyl acetate, n-ethyl acetate, n-propyl acetate, or the like may be used. As the ether-based solvent, dibutyl ether may be used, but is not limited thereto.

The binder may bond the particles of the active material to each other or to the current collector, thereby mechanically stabilizing the electrode. For example, the active material may be stably fixed during the repeated insertion and deintercalation of lithium ions to prevent loosening of the coupling between the active material and the conductive material. The binder may suitably include polyvinyl alcohol, carboxymethyl cellulose, hydroxypropyl cellulose, diacetyl cellulose, polyvinyl chloride, carboxylated polyvinyl chloride, polyvinyl fluoride, polymer including ethylene oxide, polyvinylpyrrolidone, poly urethane, polytetrafluoroethylene, polyvinylidene fluoride, polyethylene, polypropylene, styrene-butadiene rubber, acrylated styrene-butadiene rubber, epoxy resin, nylon and the like, but the material that can be used as the binder is not limited thereto.

Silica may be added to the solvent component together with the binder, and the binder solution may be prepared by stirring the mixture at about 300 rpm for about 24 hours or more at room temperature.

The positive electrode active material and the conductive material may be mixed in the prepared binder solution.

NCM-based lithium oxide may be used as the positive electrode active material. For example, NCM622 in which nickel, cobalt, and manganese may be mixed in a ratio of about 6:2:2 ratio may be used. Alternatively, NCM811 in which nickel, cobalt, and manganese may be mixed in a ratio of about 8:1:1 may be used.

The conductive material may impart conductivity to the electrode. In the battery constructed, any electronically conductive material without causing a chemical change may be used. For example, natural graphite, artificial graphite, carbon black, acetylene black, Ketjen black, carbon fiber, metal powder such as copper, nickel, aluminum, and silver, metal fiber, etc. may be suitably used as the conductive material. In addition, one or more types of conductive materials such as polyphenylene derivatives may be used together.

Silica fume may be used as the silica. As used herein, silica fume refers to ultra-fine silicon by-products generated during the manufacture of silicon.

The silica may have a particle diameter of about 1 to 7 nm, but the diameter range is merely exemplary and is not limited thereto.

According to exemplary embodiments, adhesiveness of the slurry composition may be improved even with a reduced amount of binder by adding silica. As results, the electrochemical properties of a lithium secondary battery may be improved by reducing the content of the binder and increasing the content of the positive electrode active material or the conductive material.

EXAMPLE

Hereinafter, the effects of the present invention will be described in detail with reference to comparative examples and examples.

TABLE 1

| Comparative Examples and Examples | | | | |
|---|---|---|---|---|
| | Range of composition (weight ratio) | | | |
| | Active material | Conductive material | Binder | Silica fume |
| Comparative Example 1 | 93 | 4 | 3 | 0 |
| Comparative Example 2 | 93 | 4 | 1.5 | 1.5 |
| Example 1 | 93 | 4 | 2.7 | 0.3 |
| Example 2 | 93 | 4 | 2.4 | 0.6 |
| Example 3 | 93 | 4 | 2 | 1 |

Table 1 shows the weight ratios of a positive electrode active material, a conductive material, a binder, and silica fume included in a positive electrode slurry prepared in Comparative Examples and Examples.

In Comparative Examples and Examples, each material was added to NMP serving as a solvent to prepare a slurry. NCM622 was used as the positive electrode active material, a mixture of carbon black and graphite in a ratio of 3:1 was used as the conductive material, and PVdF was used as the binder. Silica fume having a particle diameter of 7 nm was used as the silica.

Thereafter, the prepared slurry was applied to a current collector made of aluminum foil and dried at a temperature of about 160° C. for 12 hours to prepare a positive electrode.

In order to evaluate the electrochemical properties, a 2032-coin cell was prepared. 1.15M of $LiPF_6$ salt was used as an electrolyte, 2 wt % of VC was used as an additive, and a solvent consisting of EC and EMC mixed in a ratio of 3:7 was used to prepare the coin cell.

The first feature will be described in more detail. Although the content of the binder is lowered, C—F bonds and hydrogen bonds of PVdF can be formed by —OH functional groups present on the surface of the silica fume. Therefore, it is possible to suppress the flow of the positive electrode active material and the like in the process of applying the slurry on the electrode.

The adhesive strength at the interface between the current collector and the positive electrode active material for Comparative Examples and Examples are shown in Table 2 below.

The adhesive strength was measured with a surface and interfacial cutting analysis system (SAICAS).

TABLE 2

| Comparison in adhesive strength between Comparative Examples and Examples | | | | | |
|---|---|---|---|---|---|
| | Range of composition (weight ratio) | | | | Physical properties Interfacial adhesive |
| | Active material | Conductive material | Binder | Silica fume | strength (N/m) |
| Comparative Example 1 | 93 | 4 | 3 | 0 | 74.4 |
| Comparative Example 2 | 93 | 4 | 1.5 | 1.5 | — |
| Example 1 | 93 | 4 | 2.7 | 0.3 | 150.9 |
| Example 2 | 93 | 4 | 2.4 | 0.6 | 93.1 |
| Example 3 | 93 | 4 | 2 | 1 | 57.0 |

As shown in Table 2, in the case of Comparative Example 2 in which silica fume was contained in an amount of 1.5%, the viscosity was too high to prepare a slurry. Therefore, the adhesive strength could not be measured.

Examples 1 and 2 showed about 1.25 to 2 times the adhesive strength of Comparative Example 1. This is because, aside from hydrogen bonding, the silica fume has an effect of lowering the crystallinity of the polymer included in the binder chain.

TABLE 3

|  | Crystallinity (%) |
| --- | --- |
| Comparative Example 1 | 38.1 |
| Example 1 | 27.1 |
| Comparative Example 2 | 26.5 |
| Example 2 | 14.7 |

As shown in Table 3, silica fume was included in the binder solution, thereby causing an increase in the amorphous section in the polymer form, resulting in the effect of improving the adhesion with the current collector.

On the other hand, referring to Table 1, in the case of Example 3, since the binder content was reduced to 2%, the adhesive strength was slightly lower than that of Comparative Example 1. However, referring to the graph in FIG. 1, in Example 3, the binder was uniformly dispersed compared to Comparative Example 1 (as measured with SAICAS).

This suggests that the examples may have an improved effect compared to the comparative example in terms of electrochemical properties to be described below, and specific details thereof will be described below.

As described above, positive electrodes are manufactured from the slurries of Comparative Examples and Examples, and coin cells were manufactured using the positive electrodes, and electrochemical properties of the coil cells were measured. Specifically, the cycle characteristics at a high temperature (for example, 60° C.) were measured, and the cycle characteristics in a high output (e.g., 4 C) condition at room temperature were measured. In addition, the loading amount of the prepared positive electrode was 18.4 mg/cm'.

Figure 2:
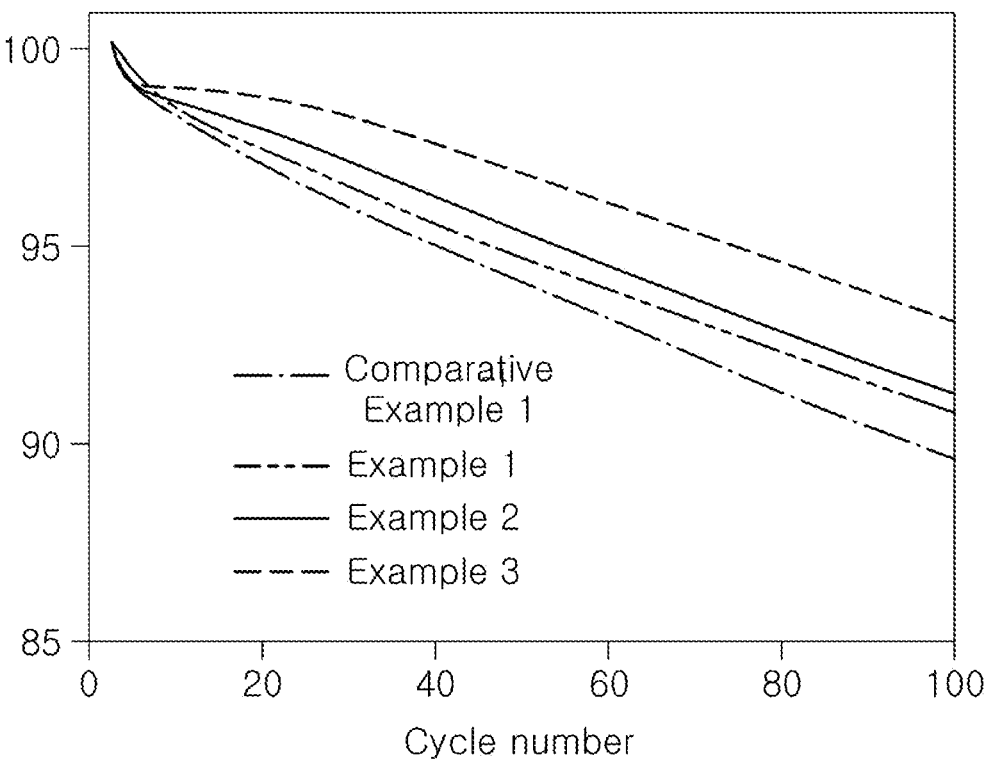
FIGS. 2 and 3 show graphs showing comparison in cycle characteristics between Examples according to exemplary embodiments of the present invention and Comparative Examples.
Figure 3:
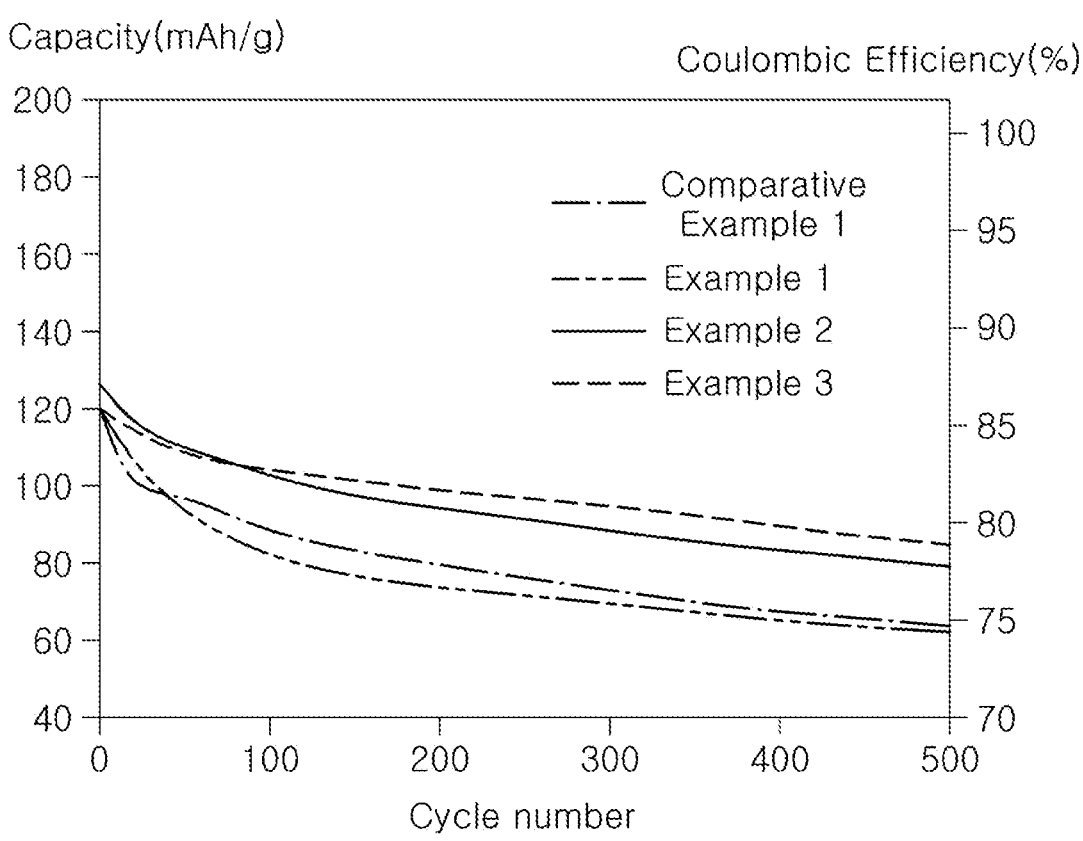

The test results are summarized in FIGS. 2 and 3. As shown in FIG. 2, the lifespans at high temperatures were evaluated. Example 3 had the highest capacity retention rate after 100 cycles. It is considered that HF generated when the electrolyte of a lithium secondary battery was decomposed at high temperature reacts with silica fume to prevent deterioration of the positive electrode.

As shown in FIG. 3, silica fume was added and thus lifespan characteristics under high output conditions were improved even at a high electrode loading amount. Example 3 showed a capacity retention rate of 87.4%, and Comparative Example 1 showed a capacity retention rate of 73.7%. That is, it was confirmed that the capacity retention rate was improved by 18.6%. This can be attributed to the fact that the binder was uniformly distributed in the positive electrode active material through the silica fume, and the electrolyte was well impregnated in the electrode due to the affinity of the silica to the electrolyte.

Although only exemplary embodiments have been described, those skilled in the art will appreciate that various modifications and changes thereto are possible without departing from the scope and spirit of the present invention as claimed.

What is claimed is:

1. A composition for a positive electrode of a lithium secondary battery, comprising:
a positive electrode active material,
a conductive material,
a binder, and
silica,
wherein a weight ratio between the positive electrode active material, the conductive material, the binder, and the silica ranges from about 93:4:2.7:0.3 to about 93:2.4:0.6.

2. The composition of claim 1, wherein the silica comprises silica fume.

3. The composition of claim 1, wherein the silica has a diameter of about 1 to 7 nm.

4. The composition of claim 1, wherein the positive electrode active material comprises one or more selected from nickel, cobalt, and manganese.

5. The composition of claim 1, further comprising a solvent component.

6. A method of preparing a composition for a positive electrode of a lithium secondary battery, comprising:
preparing a binder composition comprising a binder, silica, and a solvent component; and
adding a positive electrode active material and a conductive material with the binder solution,
wherein a weight ratio between the positive electrode active material, the conductive material, the binder, and the silica ranges from about 93:4:2.7:0.3 to 93:2.4:0.6.

7. A positive electrode for a lithium secondary battery, wherein the positive electrode is made of a slurry composition of claim 1.

8. The positive electrode of claim 7, wherein the positive electrode has a loading density of the positive electrode active material ranging from about 3.0 to about 19.0 mg/cm2.

9. A lithium secondary battery comprising a positive electrode of claim 7.

* * * * *